United States Patent [19]

Drach

[11] 4,391,878

[45] Jul. 5, 1983

[54] WET STRENGTH RESINS

[75] Inventor: John E. Drach, Montgomery County, Pa.

[73] Assignee: Scott Paper Company, Philadelphia, Pa.

[21] Appl. No.: 286,078

[22] Filed: Jul. 24, 1981

[51] Int. Cl.³ .................... B32B 9/00; C08F 222/02; C08F 222/38
[52] U.S. Cl. ................................ 428/479.6; 8/194; 162/168.2; 526/304
[58] Field of Search ................ 526/304; 428/274, 288, 428/290, 479.6, 537; 162/168 N; 525/327, 329, 378; 8/194

[56] References Cited

U.S. PATENT DOCUMENTS

| | | | |
|---|---|---|---|
| 2,621,169 | 12/1952 | Robinette et al. | 260/78.5 |
| 2,999,038 | 9/1961 | Drennem et al. | 117/155 |
| 3,017,291 | 1/1962 | McLaughlin et al. | 117/119.6 |
| 3,041,315 | 6/1962 | Gerlich et al. | 526/304 |
| 3,442,698 | 5/1969 | Dill et al. | 525/378 |
| 3,555,585 | 1/1971 | Cuculo | 8/116.2 |
| 4,061,465 | 12/1977 | Frankin et al. | 8/194 |

FOREIGN PATENT DOCUMENTS 45-41609 12/1970 Japan .

OTHER PUBLICATIONS

Cuculo, Textile Research Journal, (Apr. 1971) pp. 321-326.
Cuculo, Textile Research Journal, 41 (No. 5) (May 1971) (pp. 375-378).
Johnson et al., Textile Research Journal, (May 1973) (pp. 283-293).
Johnson et al., Textile Research Journal (Apr. 1975) (pp. 314-316).
Franklin, Textile Research Journal (Jun. 1976) pp. 393-397.

*Primary Examiner*—Harry Wong, Jr.
*Attorney, Agent, or Firm*—John A. Weygandt; John W. Kane, Jr.

[57] ABSTRACT

Water soluble wet strength resins containing maleamic acid and at least one other ethylenically unsaturated monomer, such as vinyl esters, olefins, acrylic and/or methyacrylic acids and/or their esters and/or their aminides are useful in the preparation of paper products having improved, off-machine dry strength and wet strength properties.

10 Claims, No Drawings

WET STRENGTH RESINS

BACKGROUND OF THE INVENTION

1. Field of the Invention

The present invention relates, generally, to novel, wet strength resins; to a process for preparing said resins; to a process for treating paper with said resins to improve the off-machine wet strength and dry strength thereof; and to a paper product having improved wet and dry strength properties. More particularly this invention relates to wet strength resins containing maleamic acid and at least one other ethylenically unsaturated monomer, such as vinyl esters, olefins, acrylic and/or methyacrylic acids and/or their esters and/or their amides, and to paper with improved wet and dry strength properties which has been treated with said resins.

2. Description of the Prior Art

In a conventional paper-making operation cellulosic fibers are dispersed in water, drained on a wire screen, pressed into close physical contact and dried. The result is a paper sheet in which the individual fibers are held together by hydrogen bonds which give strength to the dry sheet. When the dry sheet is wet, these hydrogen bonds are broken and the paper loses most of its strength.

To prevent this loss of strength, various chemical treatments have been employed. Among the most successful treatments is the use of synthetic resins which, when added to the cellulosic fibers, either before or after a sheet is formed therefrom, and cured or polymerized, can significantly increase the wet strength of the sheet.

Most commonly used are the urea formaldehyde resins, the product of the condensation of urea and formaldehyde, and melamine-formaldehyde resins, the condensation product of melamine and formaldehyde. An outstanding disadvantage associated with the use of these resins is that if they are not totally cured, a sheet treated with them can emit formaldehyde or toxic aldehydic residues can remain in the sheet. Other resins useful in increasing the wet strength of cellulosic webs include polyamine-epihalohydrin resins, the condensation product of polyamines with epihalohydrins, glyoxalated polyacrylamide resins which are the product of the addition polymerization of N-glyoxalated acrylamide and at least one other ethylenically unsaturated monomer and/or an ethylenically unsaturated basic nitrogen-containing monomer.

Recently, it has become desirable to eliminate the use of formaldehyde-based wet strength resins because of the known and suspected toxic effects of formaldehyde. Formaldehyde-based resins, such as urea-formaldehyde and melamine-formaldehyde resins, cure or crosslink by the formation of intermolecular methyleneamide crosslinkages. Formaldehyde is another product of this crosslinking reaction and can at any time be released during the production or use of products treated with formaldehyde-based resins since the curing or crosslinking reaction continues for an extended period even at room temperature. In order to circumvent the possibility of exposure to formaldehyde, this invention describes wet strength resins which are copolymers of amic acids. These resins function as wet strengthening agents by reaction with the cellulose molecules of a cellulosic web. The reaction takes place between the pendent amide functionalities of the amic acid portion of the copolymers and the hydroxyl groups of the cellulose molecules.

The general reaction between beta-amic acids and alcohols to form half-acid esters was described by Cuculo in a series of publications in the Textile Research Journal, Volume 41 pages 321–326; Volume 41 pages 375–378; volume 43 pages 283–293; volume 45 pages 314–316; volume 46 pages 393–397. These publications describe the preparation of half-acid esters of cellulose by the facile reaction of beta-amic acids and cellulosic hydroxyl groups.

U.S. Pat. No. 3,555,585 describes the preparation of cellulose half-acid esters by reaction of beta-carbamyl or gamma-carbamyl acids with cellulose. The disclosure is concerned with modification of non-woven, cellulosic webs to yield disposable fabrics by the formation of cellulose half-acid esters through the reaction of the cellulosic fabric with a carbamyl substituted organic acid.

The use of salts of copolymers of maleic acid and an ethylenically unsaturated monomer for improving the wet strength of paper has been known since at least 1952. U.S. Pat. No. 2,621,169 granted Dec. 9, 1952 to Robinette et al discloses that ammonium salts of copolymers of styrene and maleic anhydride have utility in improving the wet strength of paper (without specifically teaching how such improvement is obtained). Robinette et al emphasize however that care must be taken in preparing the polymeric compositions of their invention to avoid the formation of amides. Thus the prior art as represented by U.S. Pat. No. 2,621,169 teaches away from the present invention wherein it has been found that resins containing maleamic acid impart wet strength to paper.

U.S. Pat. No. 3,017,291 granted Jan. 16, 1962 to Mclaughlin et al describes the use of emulsion copolymers containing an acid such as maleic or aconitic, and their salts, as wet strength resins. This patent at Column 1, lines 36–39 contains the naked suggestion that salts of partial amides, such as the salt of maleamic acid, can be produced by neutralization of the emulsion copolymers of the patented invention with ammonia and amines. While there is no subsequent enabling disclosure or teaching in respect of such salts merely named by McLaughlin et al, neutralization, as normally understood by one of ordinary skill in the art and in accordance with the disclosure of an antecedent patent assigned to the same assignee, U.S. Pat. No. 2,999,038, at Column 2, lines 50–54, means that aqueous alkali, particularly ammonia, is added to the copolymer. The resulting compound, in the case hypothesized by McLaughlin et al would contain the diammonium salt of maleic acid, not the salt of a half acid, half amide characteristic of a salt of maleamic acid.

SUMMARY OF THE INVENTION

It is the teaching of this invention that water soluble copolymers containing the half acid, half amide structure of amic acids can be used to increase the wet strength of paper. These copolymers comprise (A) a half-acid, half-amide corresponding to the following general formula

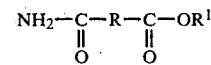

wherein R[1] is H, alkyl or alkenyl and R is a hydrocarbon chain which has radically polymerized with (B) at least one other ethylenically unsaturated monomer.

These water soluble amic acid copolymers can be prepared by reacting an anhydride-containing precursor copolymer with ammonia, namely by adding it to aqueous ammonia, thereby producing an amic acid-containing copolymer. The resulting amic acid copolymer solution can then be applied to a cellulosic web, such as paper, by a variety of methods including coating, spraying, printing and the like. The amic acid copolymers useful in this invention can also be prepared by copolymerizing an ethylenically unsaturated amic acid and at least one other ethylenically unsaturated monomer. The cellulosic webs, such as paper, treated with resins as described in this invention have off-machine wet tensiles, improved dry tensiles, and improved broke recovery after the finishing operation.

If it is desired that the copolymer be substantive to cellulose, copolymers can be made by reacting an ethylenically unsaturated amic acid and at least one other ethylenically unsaturated monomer and at least one other ethylenically unsaturated basic nitrogen-containing monomer. The basic nitrogen-containing monomer will impart a cationic character to the copolymer which makes it attractive to anionic cellulose fibers for deposition in the wet end of a paper machine. Suitable examples of the other ethylenically unsaturated, basic nitrogen-containing monomer include N,N-dimethylaminoethylmethacrylate, N,N-diethylaminoethylmethacrylate, N,N-dimethylaminoethylacrylate, N,N-diethylaminoethylacrylate, 2-vinylpyridine, 4-vinylpyridine, and N-(t-butyl)-aminoethylmethacrylate.

The ethylenically unsaturated amic acids useful in synthesizing these cellulose-substantive polymers are polymerizable compounds of the following general formula:

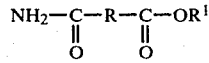

wherein R is a hydrocarbon chain containing a multiple bond capable of radical polymerization and R[1], is H, alkyl or alkenyl. The amount of the amic acid which can be used along with the other monomeric species to make up the desired amic acid copolymer must be chosen so as to render the resulting copolymer water soluble. Depending upon the nature of the other comonomers, this amount can range from 5% to 50% by weight of the copolymer.

The other ethylenically unsaturated monomers useful in synthesizing the desired amic acid precursor polymer include acrylic and/or methacrylic acids and/or their esters, amides, substituted amides, and nitriles. Also useful are esters of vinyl alcohol, vinyl ethers and ketones, acrolein, styrene and substituted styrenes, vinyl pyridines, ethylene, butadiene, maleic, fumaric and itaconic acids and esters and substituted amides, polymerizable derivatives of allyl alcohol, vinylacetic acid and the like.

The wet strength resins as described in this disclosure may be applied to cellulosic webs, such as paper, by any conventional technique for applying a polymer to a cellulosic web. In the case where the web is already formed, the polymer or resin may be applied by coating, printing, or spraying. In the case of addition to cellulosic fibers prior to web formation, the resin, if it bears a net positive charge, can be added to a slurry of fibers, as in the wet end of a paper machine. The net positive charge on the resin renders it substantive to cellulose. The amount of resin added to the web can vary, depending upon the degree of wet strength desired. The preferred amount of resin to be applied is in the range of 0.1 to 5% based upon weight of fiber. The curing or crosslinking reaction can be accelerated by the addition of mineral acids or salts of acids such as ammonium, magnesium, zinc and tin chlorides, nitrates or sulfates.

The increase in wet tensile of cellulosic webs treated with the resins as described in this invention is due to the crosslinking of the amic acid copolymer molecules with the cellulosic substrate.

The polymerization of these monomers to yield water soluble copolymers can be accomplished by well known polymerization techniques as described in such chemistry texts as POLYMER SYNTHESIS, Volume I, II, and III, by Stanley R. Sandler and Wolf Karo, Academic Press, New York and London, (1974), and PREPARATIVE METHODS OF POLYMER CHEMISTRY, second edition, by Wayne R. Sorenson and Tod W. Campbell, Interscience Publishers (John Wiley & Sons), New York (1968).

DESCRIPTION OF THE PREFERRED EMBODIMENTS

The polymer composition of this invention is a water soluble addition copolymer of an ethylenically unsaturated amic acid and at least one other ethylenically unsaturated monomer. Preferably, the ethylenically unsaturated amic acid is (I) maleamic acid, (Z)-4-amino-4-oxo-2-butenoic acid

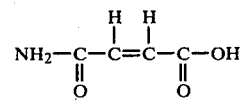

(II) fumaramic acid, (E)-4-amino-4-oxo-2-butenoic acid

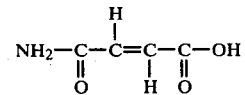

or (III) itaconamic acid, 4-amino-4-oxo-2-methylene butanoic acid

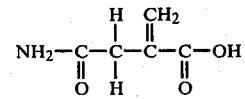

Among the other ethylenically unsaturated monomers useful in this invention are the vinyl esters of aliphatic acids which have one to ten carbon atoms. The preferred vinyl ester is vinyl acetate especially when used with esters of acrylic or methacrylic acids. The acrylate and methacrylate esters of alkyl and cycloalkyl alcohols having one to twenty carbon atoms are most efficacious in forming useful copolymers with vinyl acetate. The preferred esters of methacrylic acid are methyl, ethyl, n-propyl, n-butyl, iso-butyl, 2-ethylhexyl esters. The preferred esters of acrylic acid are methyl, ethyl, n-propyl, n-butyl, iso-butyl, 2-ethyl hexyl with n-butyl being the most preferred.

Most preferably the copolymer is composed of 80–98% by weight acrylamide, 1–10% by weight N,N-dimethylaminoethyl methacrylate, and 1–10% maleamic acid. The preferred copolymer is prepared by the addition polymerization of the respective monomers by a standard method as outlined in the chemistry texts aforementioned.

Another preferred method of making a copolymer as described in this invention is to transform an existing copolymer into an amic acid copolymer. This is done by adding an anhydride-containing copolymer to aqueous ammonia to form an amic acid copolymer.

Thus the copolymers of this invention are also formed as the products of the reaction of an anhydride-containing copolymer and aqueous ammonia. These anhydride-containing copolymers have a general formula -comonomer-anhydride-comonomer-anhydride-comonomer-anhydride- The anhydride-containing copolymer as described by the above general formula is the product of the addition polymerization reaction of an ethylenically unsaturated, polymerizable anhydride and at least one other ethylenically unsaturated monomer.

The ethylenically unsaturated, polymerizable anhydride used to synthesize the anhydride-containing copolymer is a cyclic anhydride containing a polymerizable multiple bond capable of radical polymerization. Most preferably the cyclic anhydride is maleic anhydride or itaconic anhydride.

Among the other ethylenically unsaturated monomers used to make the anhydride-containing copolymer are the vinyl esters of aliphatic acids which have one to ten carbon atoms; alkyl vinyl ethers which have alkyl groups composed of from one to ten carbon atoms and whose alkenyl groups are composed of from one to ten carbon atoms; alkenes; and alkadienes which have from one to ten carbon atoms.

The preferred vinyl esters of aliphatic acids are vinyl acetate and vinyl propionate. The preferred alkyl vinyl ethers are methyl vinyl ether, ethyl vinyl ether, butyl vinyl ether and propyl vinyl ether. The preferred alkene and/or alkadiene are ethylene, propylene, 1-butene, 2-butene and 1,3-butadiene.

In order to describe the present invention so that it may be more clearly understood, the following examples are set forth. These examples are set forth primarily for the purpose of illustration, and any specific enumeration of detail contained therein should not be interpreted as a limitation on the concept of this invention.

EXAMPLE 1

Into a 500 ml reaction flask equipped with a mechanical stirrer, thermometer, and addition funnel were placed 82.0 grams of water and 8.4 grams of 29% aqueous ammonia (0.143 moles). To the ammonia solution is added 10 g of a maleic anhydride methyl vinyl ether copolymer (1:1 mole ratio) (commercial product trademark Gantrez-AN 119, GAF Corp.) in small increments while maintaining a reaction temperature of 65° C. After all the copolymer has been added, the solution was removed from the reactor and diluted with 1133.6 grams of water.

EXAMPLE 2

Into a 500 ml reaction flask equipped with a mechanical stirrer, thermometer and addition funnel were placed 304 grams of water and 46 grams of 29% aqueous ammonia (0.785 moles). To this solution is added 50 grams of a maleic anhydride-ethylene copolymer (1:1 mole ratio) (commercial product trademark EMA 1103, Monsanto, Inc.) in small increments while maintaining the reaction temperature of 65° C. After all the copolymer has been added, the solution is cooled to room temperature.

EXAMPLE 3

The following tables illustrate the properties achieved by utilizing the resins prepared in the above examples. Approximately 100 grams of the solution from Example 1 is placed in the container so as to form a saturation bath. All the data presented was obtained from filter paper sheets (Whatman Chromatography Paper #4) measuring approximately 9" MD (machine direction)×7.5" CD (cross direction) which are immersed in the saturation bath. After saturation, the sheets are squeezed through a laboratory wringer, dried overnight at room temperature and cured for 3 minutes at 300° F. (149° C.). Some of these sheets are then tested for increases in wet and dry tensiles relative to untreated controls. The results are depicted in Table I. The remainder of the treated sheets are allowed to stand at room temperature for an extended period and tested for wet tensile development through natural aging. The results are shown in Table II.

In the tables which follow, the amount of resin applied to the sheet is expressed under the column "% Addition" as a percent by weight of the sheet. Tensile measurements were obtained on a Thwing Albert Tensile Tester in accordance with TAPPI Standard Number T 456m-49. Tensile was measured cross direction for a dry strip (CDT) and a wet strip (CDWT). All tensile values are reported as pounds/inch. These values may be converted to the standard metric unit of grams per 15 millimeters by multiplying by 268.4.

TABLE I

| Treatment | % Addition | Cured Tensiles | |
|---|---|---|---|
| | | CDWT | CDT |
| Example 1 | 1.8 | 5.33 | 11.1 |
| Example 2 | 1.7 | 6.47 | 13.16 |
| Control | 0.0 | 0.0 | 6.7 |

TABLE II

| Wet Tensile Increase as a Function of Time - Example I Treatment - 1.8% Addition | | |
|---|---|---|
| Time After Treatment | CDWT | CDT |
| 12 hours | 0.2 | 9.0 |
| 1 week | 2.00 | 9.1 |
| 2 weeks | 2.2 | 9.0 |
| 3 weeks | 2.5 | 8.9 |

What is claimed is:

1. A cellulosic fibrous web wherein the cellulose fibers are chemically modified by a cross-linking reaction with a wet strength resin comprising a water soluble copolymer comprised of (A) a half-acid, half-amide corresponding to the following general formula:

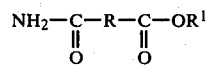

wherein R' is H and R is a hydrocarbon chain containing a double bond which has radically polymerized with (B) at least one other ethylenically unsaturated monomer.

2. The web in accordance with claim 1 wherein said copolymer is present in an amount equal to 0.1 to 5% based on the weight of the fiber in the web.

3. The web according to claim 1 wherein the half-acid, half-amide corresponding to the general formula is maleamic acid.

4. The web according to claim 1 wherein the half-acid, half-amide corresponding to the general formula is fumaramic acid.

5. The web according to claim 1 wherein the half-acid, half-amide corresponding to the general formula is itaconamic acid.

6. The web according to claim 1 wherein the other ethylenically unsaturated monomer comprises a vinyl ester of an aliphatic acid having one to ten carbon atoms.

7. The web according to claim 6 wherein said monomer is vinyl acetate.

8. The web according to claim 7 wherein the copolymer further includes esters of acrylic or methacrylic acids.

9. The web according to claim 1 wherein component (B) of the copolymer comprises an ethylenically unsaturated, basic nitrogen containing monomer.

10. The web according to claim 1 wherein the half-acid, half-amide comprises from 1 to 10% by weight of the copolymer.

* * * * *